United States Patent [19]

Manson et al.

[11] 4,083,858
[45] Apr. 11, 1978

[54] ANTHRAQUINONE DYES

[75] Inventors: John Stuart Manson; Denis Robert Annesley Ridyard, both of Manchester, England

[73] Assignee: Imperial Chemical Industries Limited, London, England

[21] Appl. No.: 603,967

[22] Filed: Aug. 12, 1975

Related U.S. Application Data

[63] Continuation of Ser. No. 293,057, Sep. 28, 1972, abandoned.

[30] Foreign Application Priority Data

Oct. 12, 1971 United Kingdom ............... 47453/71

[51] Int. Cl.$^2$ ..................... C07C 143/665; C09B 1/52
[52] U.S. Cl. ..................... 260/373; 260/371; 260/380
[58] Field of Search ................. 260/371, 373, 380

[56] References Cited

U.S. PATENT DOCUMENTS

| | | | |
|---|---|---|---|
| 2,258,551 | 10/1941 | Grossmann | 260/380 |
| 3,444,215 | 5/1969 | Gehrke | 260/380 |
| 3,458,537 | 7/1969 | Johnson | 260/373 X |
| 3,600,410 | 8/1971 | Berninger | 260/373 |
| 3,767,682 | 10/1973 | Harvey | 260/380 X |
| 3,828,040 | 8/1974 | Bien | 260/373 X |
| 3,883,567 | 5/1975 | Harvey | 260/380 |

FOREIGN PATENT DOCUMENTS

| | | | |
|---|---|---|---|
| 1,577,092 | 8/1969 | France | 260/380 |
| 86,150 | 10/1894 | Germany | 260/380 |
| 593,955 | 10/1947 | United Kingdom | 260/380 |

*Primary Examiner*—Paul F. Shaver
*Attorney, Agent, or Firm*—Cushman, Darby & Cushman

[57] ABSTRACT

A process for the manufacture of water-soluble anthraquinone dyes having the general formula:

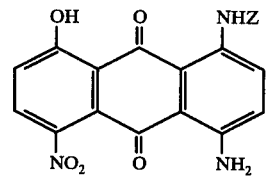

wherein Z represents an optionally substituted hydrocarbon residue carrying at least one half sulphuric acid ester or sulphonic acid group which comprises reacting 1,8-dihydroxy-4-amino-5-nitroanthraquinone with a primary amine of the formula:

Z-NH$_2$ in the presence of boric acid or its anhydride or a derivative thereof and a secondary or tertiary organic base or a polar solvent.

1 Claim, No Drawings

ANTHRAQUINONE DYES

This is a continuation, of application Ser. No. 293,057 filed Sept. 28, 1972, now abandoned.

This invention relates to anthraquinone dyes and more particularly to water-soluble anthraquinone dyes and their manufacture.

According to the invention there is provided a process for the manufacture of water-soluble anthraquinone dyes having the general formula

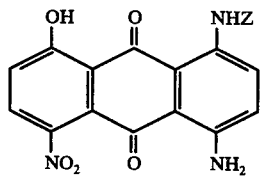

wherein Z represents an optionally substituted hydrocarbon residue carrying at least one half sulphuric acid ester or sulphonic acid group which comprises reacting 1,8-dihydroxy-4-amino-5-nitroanthraquinone with a primary amine of the formula:

Z-NH$_2$ in the presence of boric acid or its anhydride or a derivative thereof and a secondary or tertiary organic base or a polar solvent.

The primary amine used in the process of the invention has at least one half sulphuric acid ester or sulphonic acid group attached to an optionally substituted hydrocarbon residue. As examples of substituents which may be represented by Z there may be mentioned the following:

(a)

wherein R represents hydrogen or alkyl, X represents optionally substituted alkylene and W represents —O— or a direct link,

(b)

wherein X represents optionally substituted alkylene, especially ethylene, V represents a direct link, —O—, —S— or —NQ— wherein Q is hydrogen or lower alkyl, W represents —O— or a direct link and aromatic ring A may be optionally substituted by alkyl, alkoxy, hydroxy or halogen,

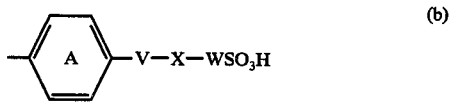

(c)

wherein R represents hydrogen or alkyl, X represents a direct link or optionally substituted alkylene, W represents —O— or a direct link and aromatic ring A may optionally be substituted by alkyl, alkoxy, or hydroxy

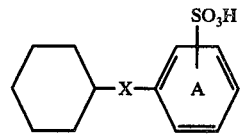

(d)

wherein X may be optionally substituted alkylene, aromatic ring A may optionally be substituted by alkyl or alkoxy and the cyclohexyl ring may optionally be substituted.

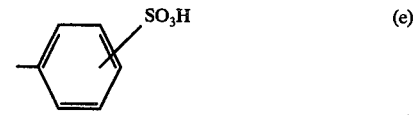

(e)

wherein the aromatic ring may optionally be substituted by, for example, alkyl, alkoxy, hydroxy, nitro, acylamino and halogen, for example:

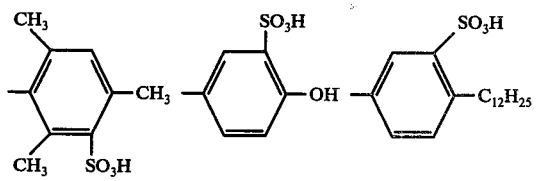

As examples of derivatives of boric acid which can be used in the process there may be mentioned compounds of the formula (MO)$_3$B wherein M is an alkyl or aryl radical; and as specific examples of such compounds there may be mentioned tri-n-propyl borate, tri-n-butyl borate, tri-sec-butylborate, tri-n-amyl borate, tri-n-hexyl borate, tri-phenylborate, tri-p-methylphenyl borate and tri-p-chlorophenyl borate. It is preferred to use between one and three mols of the boric acid or derivative thereof for each mol of the 1,8-dihydroxy-4-amino-5-nitroanthraquinone.

The organic base to be used in the process of the invention may be a secondary or tertiary aliphatic, cycloaliphatic, arylaliphatic or aromatic amine or a heterocyclic base. Examples of suitable bases include pyridine, piperidine, morpholine, trimethylamine and N,N-dimethylaniline. In general, the amount of base used should be in the range of from 0.1 mole to 10.0 moles based on 1,8-dihydroxy-4-amino-5-nitroanthraquinone.

Polar solvents which may be used in the process of the invention includes dimethylformamide and dimethylsulphoxide, which may be used in amounts ranging from 0.1 mole to a large excess based on 1,8-dihydroxy-4-amino-5-nitroanthraquinone.

As specific examples of primary amines of formula ZNH$_2$ there may be mentioned aniline -2-, -3- or 4-sulphonic acid, aniline -2,5-, 2,4 or 3,5-disulphonic acid, 5-acetylaminoaniline -2- sulphonic acid, 4-acetylaminoaniline -2- sulphonic acid, 2-chloroaniline -5- sulphonic acid, 3-chloroaniline -5-sulphonic acid, 4-chloroaniline -3- sulphonic acid, 2,5-dichloroaniline -4-sulphonic acid, 2-anisidine -4-sulphonic acid, 4-anisidine -2-sulphonic acid, 4-hydroxyaniline -3-sulphonic acid, 4-hydroxyaniline -2-sulphonic acid, 4-dodecylaniline -3-sulphonic acid and 4-β-sulphatoethoxyaniline.

In the process of the invention, the reaction mixture ingredients may conveniently be stirred together, preferably at a temperature between 50° C and the boiling point of the reaction mixture, for a time which is usually in the region of from 15 minutes to 30 hours.

The dyes made by the process of the present invention are suitable for the coloration of polyamide textile materials, particularly synthetic polyamide textile materials such as polyhexamethyleneadipamide materials on which they give bright colorations having high light and wet fastness properties. The dyes may be applied by the methods already described for the application of water-soluble acid dyes to polyamide materials.

The invention is illustrated but not limited by the following Examples in which all parts are by weight.

EXAMPLE 1

A mixture of 4.05 parts of boric acid, 20.5 parts of phenol and 20 parts of toluene is stirred and heated at reflux; the water formed is removed by azeotropic distillation. After cooling to 95° C, 1.5 parts of pyridine are added followed by 9.2 parts of 4-hydroxyaniline -3-sulphonic acid and 6.8 parts of 1,8-dihydroxy -4- amino -5-nitroanthraquinone. The mixture is then heated to 125° C and stirred for a further 3 hours at 125°-130° C. After cooling to 80° C, 80 parts of methanol are then added and the precipitated product is filtered off and washed with 100 parts of methanol. The product is stirred in 250 parts of hot water and filtered. The crystalline dyestuff obtained on cooling the filtrates and having the formula:

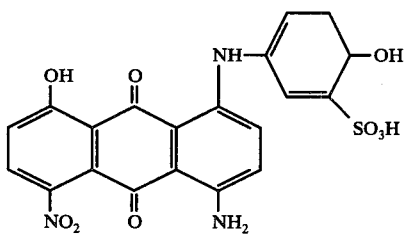

is collected and dried.

The dyestuff when applied to polyamide fibres from a weakly acid bath yields a greenish-blue shade having good fastness to washing and to light.

EXAMPLE 2

A mixture of 9 parts of boric acid, 45 parts of phenol and 20 parts of toluene is stirred and heated at reflux. The water formed is removed by azeotropic distillation. After cooling to 95° C, 7.7 parts of piperidine are added, followed by 11 parts of 4-methoxyaniline -2-sulphonic acid and 15 parts of 1,8-dihydroxy -4-amino-5-nitroanthraquinone. The reaction mixture is then stirred for 3 hours at 125°-130° C and cooled to 80° C. 80 parts of methanol are added and the precipitated product is filtered off and washed with 100 parts of methanol. The product is stirred in 250 parts of hot water and filtered. The crystalline dyestuff obtained on cooling the filtrates and having the formula:

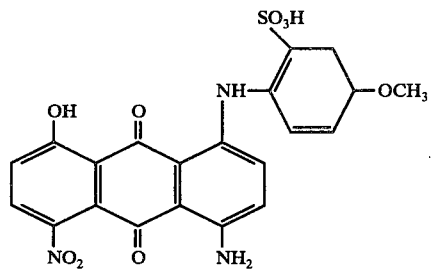

is collected and dried.

The dyestuff so obtained dyes nylon from a weakly acid bath a greenish-blue shade having very good fastness to washing and to light.

EXAMPLE 3

A mixture of 18 parts of boric acid, 90 parts of phenol and 100 parts of toluene is stirred and heated at reflux; the water formed is removed by azeotropic distillation. After cooling to 95° C, 11 parts of 4-methoxyaniline -2-sulphonic acid and 300 parts of dimethylformamide are added, followed by 15 parts of 1,8-dihydroxy -4-amino -5-nitroanthraquinone. The reaction mixture is then stirred for 18 hours at 125°-130° C and the product is isolated as described in Example 2.

The following Table gives further examples of dyestuffs which are obtained by condensing 1,8-dihydroxy -4-amino -5-nitroanthraquinone, using the conditions described in Examples 1-3 above, with the sulphonated amines listed in the second column in conjunction with the base or polar solvent listed in the third column. The fourth column gives the shades obtained when the dyestuffs are applied to polyamide textile materials.

| Example | Amine | Base/Polar Solvent | Shade |
| --- | --- | --- | --- |
| 4 | 4-hydroxyaniline-2-sulphonic acid | Pyridine | Greenish-blue |
| 5 | 4-methoxyaniline-3-sulphonic acid | Pyridine | Greenish-blue |
| 6 | aniline-2-sulphonic acid | Pyridine | Blue |
| 7 | aniline-3-sulphonic acid | Pyridine | Blue |
| 8 | aniline-4-sulphonic acid | Pyridine | Blue |
| 9 | 2-hydroxyaniline-5-sulphonic acid | Pyridine | Greenish-blue |
| 10 | 2-chloroaniline-5-sulphonic acid | Pyridine | Blue |
| 11 | 4-methylaniline-3-sulphonic acid | Pyridine | Blue |
| 12 | 4-methylaniline-2-sulphonic acid | Pyridine | Blue |
| 13 | 4-butylaniline-3-sulphonic acid | Pyridine | Blue |
| 14 | 4-amino-4'-methyl-diphenylamine-2-sulphonic acid | Pyridine | Greenish-blue |
| 15 | 4-nitroaniline-2-sulphonic acid | Pyridine | Greenish-blue |
| 16 | 2,3,6-trimethylaniline-5-sulphonic acid | Pyridine | Blue |
| 17 | 4-acetylaminoaniline-2-sulphonic acid | Pyridine | Blue |
| 18 | 5-acetylaminoaniline-2-sulphonic acid | Pyridine | Blue |
| 19 | 2-methoxyaniline-4-sulphonic acid | Pyridine | Greenish-blue |
| 20 | 4-methoxyaniline-2-sulphonic acid | Dimethyl formamide | Greenish-blue |
| 21 | 4-methoxyaniline-2-sulphonic acid | Triethylamine | Greenish-blue |
| 22 | 4-methoxyaniline-2-sulphonic acid | N,N-dimethylaniline | Greenish-blue |
| 23 | 4-methoxyaniline-2-sulphonic acid | morpholine | Greenish-blue |
| 24 | 4-methoxyaniline-2-sulphonic acid | Dimethylsulphoxide | Greenish-blue |
| 25 | 4-β-sulphatoethoxyaniline | Pyridine | Greensih-blue |

We claim:

1. A process for the manufacture of a water-soluble anthraquinone dye having the formula:

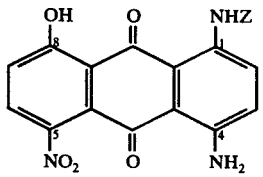

which comprises reacting 1,8-dihydroxy-4-amino-5-nitroanthraquinone with a primary amine of the formula

wherein Z represents a radical of the formula

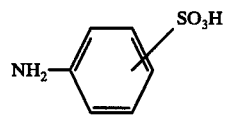

wherein the aromatic ring may optionally carry one or more substituents selected from halogen, hydroxy, lower alkyl, lower alkoxy, nitro and acetylamino, or

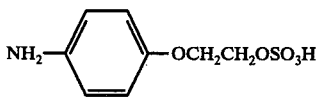

the reaction being carried out in the presence of boric acid present in amounts of 1–3 moles per mole of said 1,8-dihydroxy-4-amino-5-nitroanthraquinone and either an organic base selected from pyridine, piperidine, morpholine, triethylamine and N,N-dimethylaniline present in amounts of 0.1–10 moles per mole of said 1,8-dihydroxy-4-amino-5-nitroanthraquinone or a polar solvent selected from dimethylformamide and dimethylsulphoxide present in amounts of from 0.1 mole to a large excess per mole of said 1,8-dihydroxy-4-amino-5-nitroanthraquinone.

* * * * *